Figure 1:
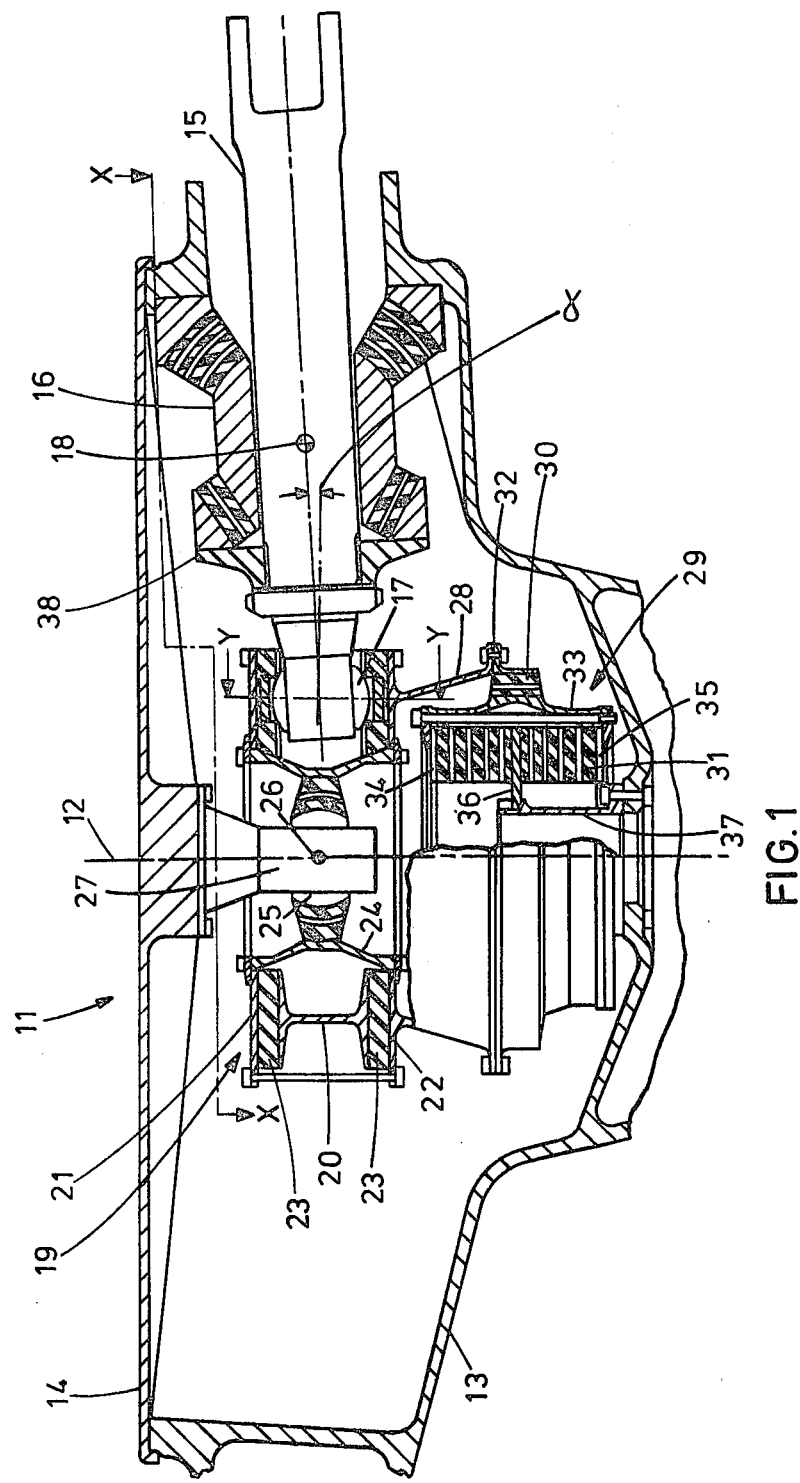

United States Patent [19]

Martin

[11] 4,297,078
[45] Oct. 27, 1981

[54] HELICOPTER ROTORS
[75] Inventor: Alfred C. Martin, Shepton Mallet, England
[73] Assignee: Westland Aircraft Limited, Yeovil, England
[21] Appl. No.: 39,492
[22] Filed: May 9, 1979
[30] Foreign Application Priority Data
May 17, 1978 [GB] United Kingdom ............... 20226/78
[51] Int. Cl.³ .............................................. B64C 27/38
[52] U.S. Cl. ................................ 416/134 A; 416/140; 416/141
[58] Field of Search ............... 416/107, 134 A, 138 A, 416/141, 134 R, 140 R, 140 A

[56] References Cited
U.S. PATENT DOCUMENTS
3,759,632  9/1973  Rybicki ........................... 416/134 A
3,764,230  10/1973  Rybicki et al. .................. 416/134 A Primary Examiner—Stephen C. Bentley
Attorney, Agent, or Firm—Larson and Taylor

[57] ABSTRACT

A helicopter rotor includes a rotor head arranged to support a plurality of rotor blades for rotation about an axis. The rotor head comprises a generally hollow structure, and each rotor blade is supported by an elastomeric bearing arranged to permit blade flap, lead/lag and feathering movements. A resilient support means is housed within the structure and is operatively associated with each rotor blade so as to provide controlled restraint of rotor blade movements in the blade flap plane. In the illustrated embodiment, the support means comprises interconnected inner and outer elastomeric assemblies, the outer assembly being connected to each rotor blade through a common elastomeric lead/lag damper unit which provides inter-blade damping of blade lead/lag movements. The outer elastomeric assembly also provides an automatic blade droop stop.

25 Claims, 3 Drawing Figures

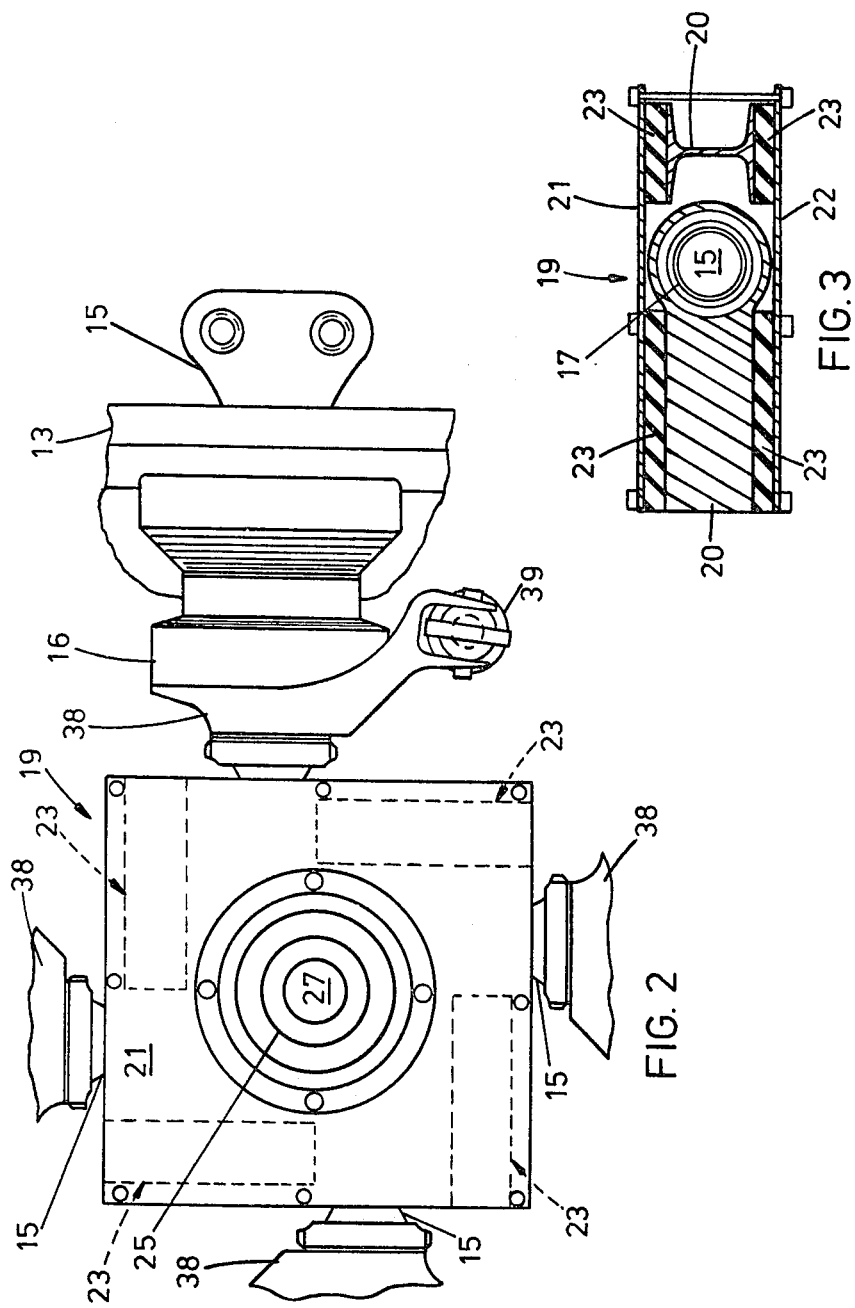

HELICOPTER ROTORS

This invention relates to helicopter rotors.

The control response and manoeuvrability of a helicopter is affected by the control moments produced in the rotor by flapping movements of each of a plurality of rotor blades. The control moments are determined by the flap hinge offset, i.e. the amount by which a flap hinge is offset from the axis of rotation, and in general the greater the offset the higher are the control moments due to the increased moment produced at the rotor head.

Articulated rotor heads are known in which rotor blade flap, lead/lag and feathering movements are provided by mechanical hinges comprising ball or roller bearings. Such rotor heads are generally large and complex, suffer from high aerodynamic drag during operation and require frequent maintenance and servicing attention due to the extremely high centrifugal loads encountered, the continuous small rotational movements necessary and the need to provide for lubrication of the mechanical hinges. Such rotor heads are further complicated by the need to provide lead/lag dampers to prevent ground resonance problems and, in some cases, powered blade folding mechanisms.

It follows, therefore, that to increase the flap hinge offset in such a rotor head will add to the problems by further complicating its construction and that of the control system, resulting in a larger heavier rotor head that will increase drag loads effective during operation.

It has been proposed to replace such mechanical bearings by elastomeric bearings in which rotor blade flap and lead/lag movements are permitted by movement about a common bearing centre. Such elastomeric bearings can also be arranged to provide blade feathering movements, and are capable of withstanding the high centrifugal loads encountered in a helicopter rotor during operation.

This substitution of elastomeric bearings for mechanical bearings has simplified the construction of articulated rotors by enabling all the required movements of a blade to be accommodated in a single bearing unit that requires no lubrication, thus reducing servicing and maintenance requirements. However, it has not solved the problem of necessarily increasing the size, in particular the overall diameter of the rotor head, if it is required to improve the control response in a particular case, since it is still necessary, for this purpose, to position the bearing, and therefore the bearing centre, more outwardly in order to increase the flap hinge offset. This, in turn, results in a corresponding increase in the length of a control run to pitch control levers, and/or in the dimensions of an operating means such as either a swash plate or a spider operating mechanism.

Accordingly, in one aspect, the invention provides a helicopter rotor including a rotor head arranged to support a plurality of rotor blades for rotation about a generally vertical axis, said rotor head including, for each rotor blade, an elastomeric bearing arranged to permit blade flap, lead/lag and feathering movements, a lead/lag damper, and resilient support means arranged to provide controlled restraint of rotor blade movement in the blade flap plane.

The elastomeric bearing may be hollow, and a spindle may be housed within the hollow bearing and extended inwardly to terminate at an inner end attached to the lead/lag damper. Conveniently, the spindle may be arranged to also protrude outwardly from the bearing and may terminate in an outer end arranged for attachment of the rotor blade.

The inner end of the spindle may support a spherical bearing that connects to the lead/lag damper. Preferably, the bearing is capable of axial sliding movement on the spindle so as to cater for blade flap and lead/lag movements during operation.

Preferably, the lead/lag damper is an elastomeric damper comprising, for each rotor blade, at least one layer of elastomer elongated in the lead/lag plane of its associated rotor blade and arranged to as to operate in shear during blade lead and lag movements. The layers of elastomer may be bonded between facing, spaced-apart surfaces of individual support members carried by the spherical bearings and means supported from the rotor head structure and common to each of said layers of elastomer so as to provide interblade lead/lag damping.

Conveniently, the individual support members may each comprise an I-section member and a layer of elastomer may be bonded between each of its opposed surfaces and surfaces of said common support means.

The common support means may comprise upper and lower annular plates interconnected by a generally tubular member carried by a spherical bearing having a geometrical centre located on the axis of rotation of the rotor head, the bearing being carried by rotor head structure so as to be capable of axial sliding movements relative the structure to cater for collective blade flap movements. Conveniently, the centreing bearing is a spherical bearing mounted on a spindle protruding axially inwardly from a cover plate attached to the rotor head.

The lower annular plate may have a downwardly extended skirt portion attached to the resilient support means.

The support means may comprise an annular outer elastomeric assembly and an inner elastomeric assembly, a flange supporting the circumference of the outer elastomeric assembly being attached to a lower extremity of the skirted portion. The outer elastomeric assembly may be located concentrically of the axis of rotation and preferably comprises alternate layers of elastomer and metal shims arranged parallel to the axis of rotation. The outer assembly may be supported internally by a tubular member arranged concentrically of the axis of rotation and secured between upper and lower annular end plates bonded to upper and lower surfaces of an annular stack of alternate layers of elastomer and metal shims forming the inner elastomeric assembly.

In one form of the invention, the alternate layers of the inner assembly may be oriented in a plane generally perpendicular to the axis of rotation and may include an annular intermediate metal plate having a radially inwardly extending flange earthed to the rotor head structure. Conveniently, the inwardly extending flange may be attached adjacent an upper end of a tubular member extending upwardly into the interior of the inner elastomeric assembly from a lower end attached to the rotor head structure. Preferably, the stack is pre-compressed between the upper and lower end plates.

In another aspect, the invention provides a helicopter rotor including a rotor head arranged to support a plurality of rotor blades for rotation about a generally vertical axis, the rotor head including, for each rotor blade, a hollow elastomeric bearing attached to rotor head structure to permit flap, lead/lag and feathering movements of its associated rotor blade, a spindle fixedly secured through the hollow bearing and protruding generally radially outwardly therefrom for attachment to the rotor blade, and resilient support means arranged to provide controlled restraint of blade flap movements and comprising an annular outer elastomeric assembly and an inner elastomeric assembly, the outer assembly being operatively associated with an inner end of the spindle which protrudes radially inwardly from the elastomeric bearing, the inner assembly being earthed to rotor head structure.

The invention will now be described by way of example only, and with reference to the accompanying drawings, in which:

FIG. 1 is a fragmentary transverse part-sectioned side elevation of a helicopter rotor constructed in accordance with the invention, FIG. 2 is a view on arrows X—X of FIG. 1, and FIG. 3 is a sectioned view on arrows Y—Y of FIG. 1.

A helicopter rotor includes a rotor head generally indicated at 11 and arranged to support four rotor blades (not shown) for rotation about a substantially vertical axis 12. The rotor head 11 comprises a hollow structure 13 having an open upper end closed by a removable cover plate 14 retained by a plurality of bolts.

Each rotor blade is attached to an outer end of a spindle 15 (one only being shown in FIG. 1) that extends inwardly into the rotor head 11. The spindle 15 is secured in a hollow elastomeric bearing assembly 16 secured to the structure 13, and protrudes inwardly therefrom to terminate at an inner end slidably located in a spherical bearing 17.

The bearing assembly 16 comprise a conical and a part-spherical elastomeric bearing each consisting of a bonded assembly of alternate layers of elastomer and metal shims. The conical and part-spherical bearings are arranged about a geometrical centre 18 and, during operation, the bearing assembly 16 permits rotor blade flap, lead/lag and feathering movements. The bearing 16 is attached to the rotor head structure 13 so as to support each spindle 15, and their associated rotor blades, at a pre-set coning angle α.

Each spherical bearing 17 connects its respective spindle 15 to a lead/lag damper unit generally indicated at 19, and carries a generally horizontal I-section support member 20 (FIGS. 1 and 3), the members 20, in the case of the four-bladed rotor of the illustrated embodiment, being arranged in a generally rectangular pattern surrounding the axis of rotation 12. Upper and lower annular rectangular plates 21 and 22 respectively, each having a circular central aperture, are spaced-apart from opposed surfaces of the support members 20, and layers of elastomer 23 are bonded between adjacent surfaces of the support members 20 and plates 21 and 22, the location of the layers 23 being shown in broken outline in FIG. 2 as being elongated in a plane coincident with a lead/lag plane of movement of its associated spindle 15.

Plates 21 and 22 therefore interconnect the respective layers of elastomer 23 so as to provide interblade damping, and provide the means of support of the damper 19 from the rotor head structure through an internal tubular member 24 carried by a spherical elastomeric centreing bearing 25. The bearing 25 has a geometrical centre 26 located on the axis of rotation 12 an is axially slidable on a spindle 27 protruding inwardly from the cover plate 15. Elastomeric bearing 25 comprises a bonded assembly of alternate layers of elastomer and metal shims.

A downwardly extending skirted portion 28 is formed integral with the lower plate 22, and serves to connect the damper unit 19 to resilient rotor blade support means, generally indicated at 29, and consisting of an annular outer elastomeric assembly 30 and an annular inner elastomeric assembly 31.

A lower flanged end of the skirted portion 28 is attached to a flange 32 formed on a circumferential support of the outer assembly 30 which comprises alternate layers of elastomer and metal shims arranged concentrically of, and parallel to, the axis of rotation 12. The outer assembly 30 is supported internally by a generally tubular member 33 arranged concentrically of the axis 12 and secured between upper and lower annular end plates 34 and 35 respectively. The inner assembly 31 consists of a stack of alternate layers of elastomer and metal shims located between the end plates 34 and 35, the layers being arranged concentrically of the axis 12 and oriented in a plane generally perpendicular to the axis 12. An intermediate metal plate 36 is bonded integrally in the stack.

The inner elastomeric assembly 31, is pre-compressed between the end plates 34 and 35 by a plurality of bolts so as to pre-load the assembly, and a radially inwardly extending flange of intermediate plate 36 is earthed to the rotor head structure 13 by a tubular member 37 extending upwardly into the interior of assembly 31 from a lower end attached to structure 13. The pre-compression of assembly 31 is sufficient to prevent tension occurring in the layers of elastomer during axial movements of end plates 34 and 35 as a result of blade flapping movements.

A pitch control arm 38 (FIGS. 1 and 2) is rotationally fixed to each spindle 15 an is attached to an inboard end of bearing assembly 16, the arms 38 being attached to downwardly extending control rods 39 routed through slots (not shown) in the lower wall of the structure 13 for connection to helicopter flying controls.

In operation of a rotor constructed in accordance with the invention, rotor blade flap, lead/lag and feathering movements are transmitted to the spindle 15 and are permitted by the elastomeric bearing assembly 16. Lead and lag movements of the rotor blade are damped by the elastomer layers 23 of the lead/lag damper unit 19 operating in shear. Preferably, the layers 23 are comprised of synthetic rubber due to its high hysteresis characteristics that provide the necessary damping requirements in this plane.

The damping arrangement of the present invention ensures that interblade damping occurs so that the damper is not effected by large in-plane lagging motions of the blades thereby minimising the size and weight of the damper unit 19. The damper centreing bearing 25 eliminates troublesome blade bending moments occurring at rotor start-up and braking, and means that the damper unit 19 does not have to cater for low frequency deflections of the rotor blades that occur during these phases of operation. This simplifiers damper design, and ensures that optimum damping requirements for a particular rotor design operating speed can be achieved.

An identical upward blade flapping movement of all of the rotor blades caused by collective pitch movement is permitted by a deflection of the annular outer elastomeric assembly 30 of the support means 29 and is accomplished by a shear movement between alternate layers of the assembly. Similarly, the restraint provided by the annular outer elastomeric assembly 30 provides a rotor blade droop stop when the rotor is at rest.

Cyclic flapping movements of the rotor blades resulting from a cyclic pitch setting of the controls are also permitted by the annular outer elastomeric assembly 30, and are transmitted to the annular inner elastomeric assembly 31 of the support means 29, causing the stack of alternate layers of elastomer and metal shims to be loaded in shear. As previously noted, the elastomer layers of the inner elastomeric assembly 31 are free from tensile loads during such blade flapping movements due to the pre-compression of the assembly.

The automatic restraint of the blade flap movements in the cyclic mode provided by the annular inner elastomeric assembly 31 serves to establish a virtual, or effective flap hinge position that is outboard of an actual hinge position defined by the geometrical centre 18 of the elastomeric bearing assembly 16 supporting each rotor blade. It will be apparent, therefore, that the invention enables an increased flap hinge offset position to be effectively achieved without having to physically increase the dimension between the axis 12 and the bearing centre 18, thereby resulting in a compact rotor head providing improved control response. Alternatively, if the flap hinge offset of an existing rotor is considered to provide adequate control response, then the invention will facilitate a reduction in the overall diameter of the rotor head by reducing the actual flap hinge offset position without detriment to the control response characteristics.

As an example only of the use of the present invention, a design for a particular helicopter has an actual flap hinge offset of 5 percent of blade radius measured from the axis of rotation, and a virtual or effective flap hinge offset position of 9 percent, thereby improving the control response of the rotor and manoeuvrability of the helicopter with no increase in an overall diameter of the rotor head.

This results in a compact assembly thereby reducing weight and aerodynamic drag, and simplifying the control system. Furthermore, the inboard location of the control arms 38 is particularly suited for use in a helicopter having a hollow gearbox since the control rods 39 can be attached to control means located within the hollow gearbox thereby further simplifying and protecting the control means, and resulting in a reduction in size and weight thereof.

This invention also facilitates the selection of any desired stiffness ratio between the flap and lead/lag planes of movement to suit any particular application.

The extensive use of elastomer in the bearings and support means of the invention results in a further simplification and a reduction in maintenance and servicing requirements. These are further enhanced by the use of a hollow rotor head structure in which the operational parts are housed thereby precluding the ingress of dirt and moisture. The hollow structure also facilitates the design of an aerodynamically clean rotor head to minimise operational drag.

Whilst one embodiment has been described and illustrated, it will be understood that many modifications may be incorporated without departing from the scope of the present invention. For example, the annular upper and lower support plates 21 and 22 of the lead/lag damper unit 19 may be of other suitable plan shapes that may be dictated by the number of rotor blades carried by the rotor head. More than two of the layers of elastomer 23 may be associated with each spindle 15 thereby increasing the bonded surface area and consequently, the damping properties. The inner elastomeric assembly 31 of the support means 29 may be part-spherical and arranged concentrically about the geometrical centre 26 of the bearing 25 supporting the lead/lag damper unit 19. Alternatively, the separated elastomeric stack comprising the inner elastomeric assembly 31 may extend across the entire enclosed area, with the intermediate plate 36 earthed to the structure 13 through a plurality of pillars located through apertures in the stacks. This increases the bonded area, and therefore the control force, and may enable a reduction in the overall height of the resilient support means 29 and, consequently, the overall height of the rotor head 11. The elastomeric centreing bearing 25 may be replaced by any suitable form of spherical bearing. Depending on design features of a rotor head/gearbox in a particular helicopter, the control rods 39 may be operated by any suitable control means such as either an internally mounted spider mechanism or an external swash plate mechanism.

I claim as my invention:

1. A helicopter rotor including a rotor head arranged to support a plurality of rotor blades for rotation about a generally vertical axis, said rotor head including, for each rotor blade, an elastomeric bearing having a geometric center and arranged to permit flap, lead/lag and feathering movements of its associated rotor blade, a lead/lag damper, and resilient support means axially spaced apart from said bearing geometric center and arranged during operation to provide controlled restraint of blade flap movements.

2. A rotor as claimed in claim 1, wherein said elastomeric bearing is a hollow bearing housing a spindle extended inwardly from the bearing for attachment to the lead/lag damper.

3. A rotor as claimed in claim 2, wherein said spindle is extended outwardly from the bearing for attachment to its respective rotor blade.

4. A rotor as claimed in claim 2, wherein the inner end of the spindle carries a spherical bearing for connection to the lead/lag damper.

5. A rotor as claimed in claim 4, wherein said bearing is capable of axial sliding movement on the spindle.

6. A rotor as claimed in claim 4, wherein said lead/lag damper comprises, for each rotor blade, at least one layer of elastomer elongated in the lead/lag plane of its associated rotor blade and arranged so as to operate in shear during blade lead and lag movements.

7. A rotor as claimed in claim 6, wherein the layers of elastomer are bonded between facing, spaced-apart surfaces of individual support members carried by said spherical bearings and means supported from the rotor head structure and common to each of said layers of elastomer.

8. A rotor as claimed in claim 7, wherein said individual support members each comprise an I-section member, a layer of elastomer being bonded between each of its opposed surfaces and surfaces of said common support means.

9. A rotor as claimed in claim 8, wherein said common support means comprises upper and lower annular plates interconnected by a generally tubular member carried by a spherical bearing having a geometrical centre located on the axis of rotation of the rotor head, said bearing being carried by the rotor head structure so as to be capable of axial sliding movements relative the structure.

10. A rotor as claimed in claim 9, wherein said lower annular plate has a downwardly extending skirted portion attached to the resilient support means.

11. A rotor as claimed in claim 1, wherein said resilient support means comprises an annular outer elastomeric assembly and an inner elastomeric assembly, said outer elastomeric assembly being attached to the lead/lag damper.

12. A rotor as claimed in claim 11, wherein said annular outer elastomeric assembly is located concentrically of the axis of rotation and comprises alternate layer of elastomer and metal shims oriented in a plane parallel to said axis of rotation.

13. A rotor as claimed in claim 12, wherein said outer elastomeric assembly is supported internally by a tubular member arranged concentrically of said axis of rotation and secured between upper and lower annular end plates bonded to upper and lower surfaces of an annular stack of alternate layers of elastomer and metal shims forming said inner elastomeric assembly.

14. A rotor as claimed in claim 13, wherein said alternate layers of said inner elastomeric assembly are oriented in a plane generally perpendicular to the axis of rotation, said stack including an annular intermediate metal plate having a radially inwardly extending flange earthed to said rotor head structure.

15. A rotor as claimed in claim 14, wherein said radially inwardly extending flange is attached adjacent an upper end of a tubular member extending upwardly into the interior of the inner elastomeric assembly from a lower end attached to said rotor head structure.

16. A rotor as claimed in claim 13, wherein said stack of alternate layers of elastomer and metal shims is precompressed between said upper and lower plates.

17. A helicopter rotor including a rotor head arranged to support a plurality of rotor blades for rotation about a generally vertical axis, said rotor head including, for each rotor blade, a hollow elastomeric bearing attached to rotor head structure to permit flap, lead/lag and feathering movements of its associated rotor blade, a spindle fixedly secured through said hollow bearing and protruding generally radially outwardly therefrom for attachment to the rotor blade, and resilient support means arranged to provide controlled restraint of blade flap movements and comprising an annular outer elastomeric assembly and an inner elastomeric assembly, said outer assembly being operatively associated with an inner end of said spindle which protrudes radially inwardly from said elastomeric bearing, said inner elastomeric assembly being earthed to the rotor head structure.

18. A rotor as claimed in claim 17, wherein said outer elastomeric assembly comprises a plurality of alternate layers of elastomer and metal shims located concentrically of the axis of rotation and parallel thereto.

19. A rotor as claimed in claim 17, wherein said inner elastomeric assembly comprises an annular stack of alternate layers of elastomer and metal shim located concentrically of the axis of rotation and oriented in a plane perpendicular to the axis of rotation.

20. A rotor as claimed in claim 19, wherein said stack is pre-compressed between upper and lower end plates supported internally from said outer elastomeric assembly.

21. A rotor as claimed in claim 19, wherein said stack includes an intermediate metal plate extended radially inwardly from an internal diameter of said stack and attached at an upper end of a tubular member extending upwardly into the interior of the stack from a lower end attached to the rotor head structure.

22. A rotor as claimed in claim 17, wherein said outer elastomeric assembly is associated with the spindle through a lead/lag damper unit.

23. A rotor as claimed in claim 22, wherein said damper unit includes an annular plate located concentrically of the axis of rotation and attached to a circumferential support of the outer elastomeric assembly, a plurality of layers of elastomer being bonded between facing spaced-apart surfaces of said plate and individual support members carried by a spherical bearing slidably mounted on the inner end of said spindle.

24. A rotor as claimed in claim 23, wherein said damper unit is supported by a centreing bearing having a geometrical centre located on the axis of rotation of the rotor head.

25. A rotor as claimed in claim 24, wherein said centreing bearing is located on a spindle for axial sliding movement relative thereto.

* * * * *